Aug. 18, 1942.   I. J. H. FEDJE   2,293,285
DOUGHNUT LIFTER
Filed June 19, 1941

I. J. H. Fedje
INVENTOR.

Patented Aug. 18, 1942

2,293,285

UNITED STATES PATENT OFFICE 2,293,285

DOUGHNUT LIFTER

Ida Johanna Halstensgaard Fedje, Berwick, N. Dak.

Application June 19, 1941, Serial No. 398,827

2 Claims. (Cl. 65—12)

This invention relates to a tool designed primarily for use in handling doughnuts, one of the objects being to provide a simple and inexpensive device whereby hot doughnuts can be lifted from the utensil in which they are being cooked, held against slipping off of the tool while in an upstanding position, supported across the top of the utensil so as to be thoroughly drained, and subsequently released for movement off of the device, all of the operations mentioned being effected simply by manipulating the tool with one hand.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figures 1, 2:
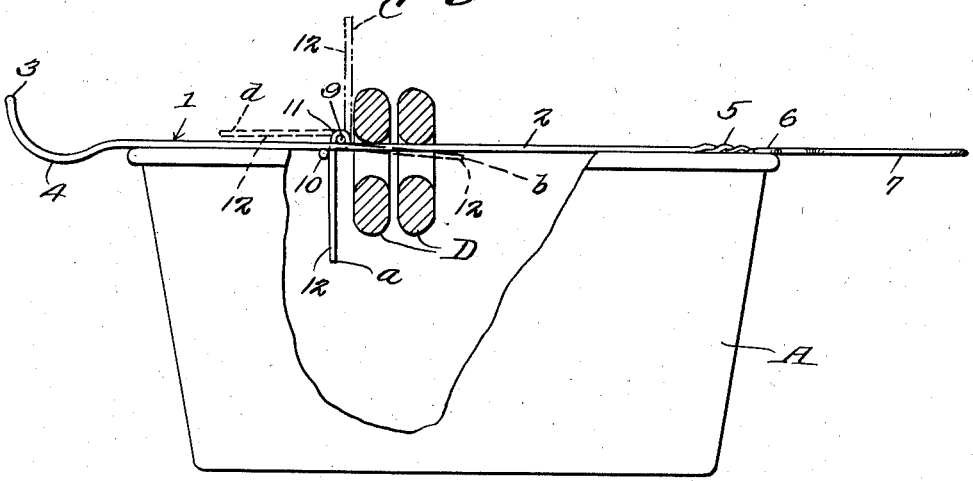
Figure 1 is a side elevation of the device, the same being shown in position supporting cooked doughnuts for drainage within a utensil, different positions of the restraining element being indicated by full and by broken lines.
Figure 2 is a plan view of the device.

Referring to the figures by characters of reference, 1 designates the elongated shank of the tool, the same being formed of a single length of stiff wire having spaced substantially parallel side portions 2 which are joined at one end by an arcuate portion 3. This shank can be bent adjacent to the end 3 so as to form a hook-like pick-up portion as shown at 4.

At the other end of the shank the side portions 2 can be joined by twisting, as shown at 5 or in any other suitable manner and these side portions are shaped to provide laterally extending loops forming wings 6 and a longitudinally extended loop or handle portion 7. At a desired point between the ends of the shank there are provided spaced cross-pins 9 and 10. These are positioned with the shank 1 extended between them, as shown particularly in Figure 1 so that when the tool is in position to drain doughnuts, as shown in said figure, the pin 9 will be uppermost while the pin 10 will be lowermost. The two pins are out of vertical alinement when the tool is in this position. Pivotally mounted on the pin 9 is the eye portion 11 of a restraining finger 12, this finger and eye portion being formed preferably of a single length of wire and the finger being adapted to swing through the space between the side portions 2 when moved in one direction and, when moved in the other direction, to come against the pin 10 which thus serves as a stop for holding the pin 12 substantially at right angles to the shank or stem 1.

A portion of a utensil in which doughnuts are to be cooked has been indicated at A. When it is desired to remove the doughnuts from this utensil the shank 1 is extended downwardly into the utensil so that the doughnuts D can be engaged and picked up by the hook-like portion of the device. Said device is then moved into position with the hook portion uppermost whereupon the doughnut which has been picked up will slide along the shank and against finger 12, causing said finger to swing back into or toward the space between the sides 2 of the shank from position a to the dotted position b in Figure 1. Thus the doughnut can slip readily past the finger and when the device is restored to its former position, the finger will swing back to position a so as thus to hold the doughnut from slipping off of the shank 1. The shank can then be used for picking up another cooked doughnut and when the hook 4 is swung upwardly, the second doughnut will slide downwardly along the shank and against finger 12 pushing the finger out of the way as before explained so that when the shank is again returned to its initial position, the finger will swing down and thus act to retain the second doughnut on the shank. This operation can be continued until a desired number of doughnuts has been accumulated on the shank. Thereafter the shank can be placed in position across the utensil 2 so that grease can drip from the doughnuts. Thereafter the tool, with the doughnuts thereon, is lifted from the utensil and the doughnuts are permitted to slide back against the wings 6. This releases the finger 12 so that by inverting the device, the finger can swing from position a to position b and thence downwardly to position c. By then bringing the device into position with the hook 4 lowermost, the doughnuts will be free to gravitate toward the hook and along shank 1 at which time they will come against the finger and thrust it from position c to position d. Thus the doughnuts will be delivered into a container. The finger is then caused to swing back to position a after which the article can again be used as already explained.

Obviously this device can be made at very low cost and the construction can be further simplified by forming the pins 9 and 10 of the ends of the wire, joining the wire and the pins to adjacent parts by the use of welding or in any other suitable manner.

As the end 3 or bill of the hook 4 is curved or arcuate, there will be no tendency of the hook sticking into the doughnuts while they are being handled.

Another advantage in the structure is found in the fact that it is possible to keep the hands at a considerable distance from the hot grease so that there is practically no danger of being burned by the grease.

What is claimed is:

1. A device of the class described including an elongated shank having spaced substantially parallel side portions, a pick-up hook at one end of the shank, a handle at the other end, stop means extending laterally from the shank adjacent to the handle, cross pieces extending transversely of and joined to the side portions, said side portions being extended between the cross pieces, and a restraining finger mounted to swing freely on one of the cross pieces and, in one direction, against the other cross piece, thereby to be limited in its swinging movement when brought to laterally extended position relative to the shank, said restraining device being mounted for swinging movement between and past the side portions of the shank away from the stop pin, thereby to release articles on the shank for sliding movement over the finger and toward the pick-up hook.

2. A tool for use in handling cooked doughnuts, including an elongated shank comprising a single length of wire bent to provide spaced substantially parallel side portions, a pick-up hook at one end, a handle at the other end, and a stop device adjacent to the handle, said hook and shank being proportioned for entering the hole in a doughnut, the ends of the wire being extended across and joined to the side portions of the shank, thereby to provide transverse pins between which the side portions of the shank are extended, and a finger mounted for free swinging movement within the shank and on one of the pins, the other pin constituting a stop for limiting the movement of the finger in one direction when brought to position substantially at right angles to the shank, thereby to retain doughnuts on the shank against sliding movement toward the hook, said finger being mounted to swing through the shank and into position extended toward the hook to release the doughnuts for sliding movement over the finger and toward the hook.

IDA JOHANNA HALSTENSGAARD FEDJE.